United States Patent
Maxwell

(10) Patent No.: US 11,173,013 B2
(45) Date of Patent: Nov. 16, 2021

(54) DENTAL SYSTEM WITH HAND PIECE FOR ENDODONTIC FILES

(71) Applicant: Joshua Maxwell, Frisco, TX (US)

(72) Inventor: Joshua Maxwell, Frisco, TX (US)

( * ) Notice: Subject to any disclaimer, the term of this patent is extended or adjusted under 35 U.S.C. 154(b) by 102 days.

(21) Appl. No.: 16/656,822

(22) Filed: Oct. 18, 2019

(65) Prior Publication Data

US 2021/0113299 A1   Apr. 22, 2021

(51) Int. Cl.
*A61C 5/50* (2017.01)
*A61C 5/42* (2017.01)
*A61C 1/14* (2006.01)
*A61C 1/00* (2006.01)
*A61C 5/44* (2017.01)

(52) U.S. Cl.
CPC .............. *A61C 5/50* (2017.02); *A61C 1/0092* (2013.01); *A61C 1/14* (2013.01); *A61C 1/148* (2013.01); *A61C 5/42* (2017.02); *A61C 5/44* (2017.02)

(58) Field of Classification Search
CPC .... A61C 5/50; A61C 5/44; A61C 5/42; A61C 1/14; A61C 1/0092; A61C 1/148
USPC .......................................................... 433/81
See application file for complete search history.

(56) References Cited

U.S. PATENT DOCUMENTS

| | | | |
|---|---|---|---|
| 2,709,852 A | | 6/1955 | Maurer et al. |
| 3,961,422 A | * | 6/1976 | Riitano ................ A61C 5/44 433/75 |
| 4,173,828 A | | 11/1979 | Lustig et al. |
| 4,229,168 A | * | 10/1980 | Scholz, Jr. ............ A61C 1/07 433/124 |
| 4,295,827 A | * | 10/1981 | Martin .................. A61C 1/148 433/81 |
| 4,330,278 A | * | 5/1982 | Martin .................. A61C 1/07 279/20 |
| 4,484,891 A | * | 11/1984 | Nash .................... A61C 1/082 433/116 |
| 4,571,183 A | * | 2/1986 | Nash .................... A61C 1/082 433/116 |
| 4,580,979 A | * | 4/1986 | Leonard ............... A61C 5/42 433/118 |
| 4,674,979 A | * | 6/1987 | Jacklich ............... A61C 5/42 433/102 |
| 4,735,200 A | | 4/1988 | Westerman |

(Continued)

FOREIGN PATENT DOCUMENTS

| EP | 0106632 A2 * | 4/1984 | ............. A61C 3/03 |
|---|---|---|---|
| EP | 0106632 A3 * | 7/1984 | ............. A61C 3/03 |

*Primary Examiner* — Matthew M Nelson
(74) *Attorney, Agent, or Firm* — Sheri Higgins Law, PLLC; Sheri Higgins

(57) ABSTRACT

A dental tool includes: a hand piece; an endodontic hand file; a stopper, wherein the stopper comprises a first hole for receiving a portion of the endodontic hand file; and a mechanical motion module that imparts mechanical motion to the endodontic hand file. A dental system includes: a hand piece; an endodontic file; and a stopper comprising at least two holes, wherein a first hole receives a portion of the endodontic file, and wherein a second hole receives a portion of a first tube for delivering a liquid to the endodontic file. The dental system can further include a second tube partially contained in a third hole of the stopper for suctioning liquids from a patient's mouth. The dental system can also further include a mechanical motion module.

15 Claims, 4 Drawing Sheets

(56) References Cited

U.S. PATENT DOCUMENTS

| | | | | |
|---|---|---|---|---|
| 4,818,229 A * | 4/1989 | Vasile | A61C 1/07 | 433/119 |
| 4,840,566 A * | 6/1989 | Leonard | A61C 1/07 | 279/82 |
| 4,911,639 A * | 3/1990 | Jacklich | A61C 1/07 | 433/102 |
| 5,236,358 A * | 8/1993 | Sieffert | A61C 17/20 | 433/102 |
| 5,393,229 A * | 2/1995 | Ram | A61C 17/20 | 132/322 |
| RE35,147 E * | 1/1996 | Apap | A61C 1/07 | 433/102 |
| 5,593,304 A * | 1/1997 | Ram | A61C 17/0217 | 433/118 |
| 6,312,255 B1 * | 11/2001 | Hudak | A61C 17/20 | 433/119 |
| 6,390,814 B1 * | 5/2002 | Gardiner | A61C 1/082 | 433/102 |
| 6,499,221 B1 * | 12/2002 | Kuhn | B23B 49/005 | 33/514 |
| 6,517,348 B1 * | 2/2003 | Ram | A61C 1/148 | 433/118 |
| 6,558,163 B2 * | 5/2003 | Riitano | A61K 6/52 | 433/224 |
| 6,702,578 B2 * | 3/2004 | Matsutani | A61C 1/082 | 433/102 |
| 7,980,853 B2 * | 7/2011 | Riitano | A61C 5/42 | 433/224 |
| 9,839,492 B2 * | 12/2017 | Wong | A61C 1/148 | |
| 2001/0041324 A1 * | 11/2001 | Riitano | A61C 5/42 | 433/102 |
| 2004/0072122 A1 | 4/2004 | Hegemann | | |
| 2006/0035196 A1 * | 2/2006 | Boiteux | A61C 17/20 | 433/82 |
| 2007/0148615 A1 | 6/2007 | Pond | | |
| 2007/0281275 A1 * | 12/2007 | Bina | A61C 5/44 | 433/165 |
| 2010/0190133 A1 * | 7/2010 | Martinez | A61C 5/40 | 433/81 |
| 2015/0064647 A1 * | 3/2015 | Wong | A61C 1/07 | 433/119 |
| 2015/0140503 A1 * | 5/2015 | Bergheim | A61C 1/07 | 433/27 |
| 2016/0022377 A1 * | 1/2016 | Ramos | A61C 1/144 | 433/102 |
| 2018/0132972 A1 * | 5/2018 | Mohammad | A61C 5/42 | |
| 2018/0153644 A1 * | 6/2018 | Bosisio | A61C 17/0208 | |
| 2018/0214247 A1 * | 8/2018 | Sharma | A61C 5/64 | |
| 2019/0008615 A1 * | 1/2019 | Karmon | A61C 8/0092 | |
| 2019/0183618 A1 * | 6/2019 | Bergheim | A61C 17/024 | |
| 2020/0038140 A1 * | 2/2020 | Bergheim | A61C 5/40 | |

* cited by examiner

DENTAL SYSTEM WITH HAND PIECE FOR ENDODONTIC FILES

TECHNICAL FIELD

A stopper for receiving an endodontic file includes two or more holes for receiving the file, a liquid delivery system tube, and/or a suction tube. The file is inserted into a hand piece. The hand piece can optionally include a rotary, vibrating, or reciprocating module for causing movement to the file.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
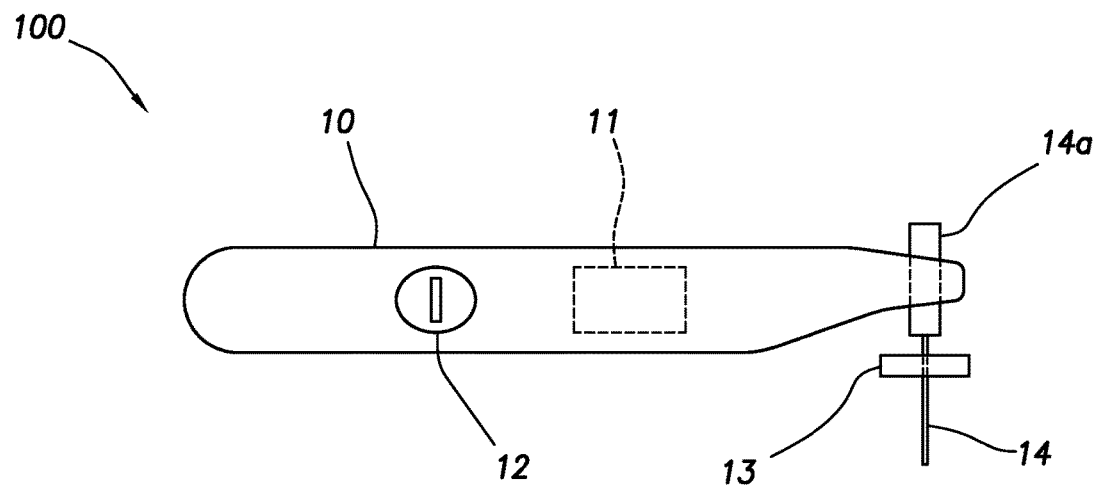
FIG. 1 is a top view of a dental tool including a hand piece, file, and stopper according to certain embodiments.

Dentists and endodontists perform a variety of procedures to a patient. Many procedures require the doctor to use a multitude of endodontic files. The files are often inserted into a stopper that prevents the file from penetrating farther into a tooth, gum, or tooth canal than desired. A file that penetrates too deeply can cause damage to a patient. Common files include hand files and rotary files. A hand file is most commonly held by the doctor's fingers and any motion is caused by movement of the doctor's hand. However, visibility into the patient's mouth is generally obscured by the doctor's fingers and/or hand. Another disadvantage to the use of hand files is the limited movement due to the only motion being caused by the doctor's hand.

During dental procedures it is often necessary to administer a liquid at the site of the procedure. For example, during a root canal, a variety of liquids such as bleach (sodium hypochlorite), chlorohexidine, sterile saline, alcohol, antibiotics, medicament, lubricant, chelating agent, drying agent, local anesthetic, or any other agent in liquid form that may be administered during an endodontic procedure. Due to the caustic nature of some of these liquids, it is imperative that the liquid be contained to the canal only and not come in contact with surrounding tissues. The administered liquids generally need to be suctioned out of the canal, which requires the use of a suction pump and tube. As used herein, a "liquid" is a substance having a continuous phase that tends to flow and to conform to the outline of its container when the substance is tested at a temperature of 71° F. (22° C.) and a pressure of 1 atmosphere (atm) (0.1 megapascals (MPa)).

Thus, there is a need for an improved dental tool that can be used with a variety of endodontic files, deliver liquids to a specific area, suction out the liquids, and provide mechanical motion to the files.

It has been discovered that a dental system can include a stopper, a hand piece, a liquid delivery system, and a suction system. Another discovery is a dental tool that includes a hand piece and a mechanical motion module for imparting mechanical motion to a hand file. The dental system and dental tool allow dentists and endodontists to perform procedures in a safe, efficient, and thorough manner.

According to certain embodiments, a dental system comprises: a hand piece; an endodontic file; and a stopper comprising at least two holes, wherein a first hole receives a portion of the endodontic file, and wherein a second hole receives a portion of a first tube.

According to certain other embodiments, a dental tool comprises: a hand piece; an endodontic hand file; a stopper, wherein the stopper comprises a first hole for receiving a portion of the endodontic hand file; and a mechanical motion module that imparts mechanical motion to the endodontic hand file.

It is to be understood that any discussion of any of the components disclosed herein is meant to include the dental tool and dental system without the need to repeat information. By way of example, any discussion related to the hand piece is meant to apply to the dental tool embodiments as well as the dental system embodiments.

Figure 2:
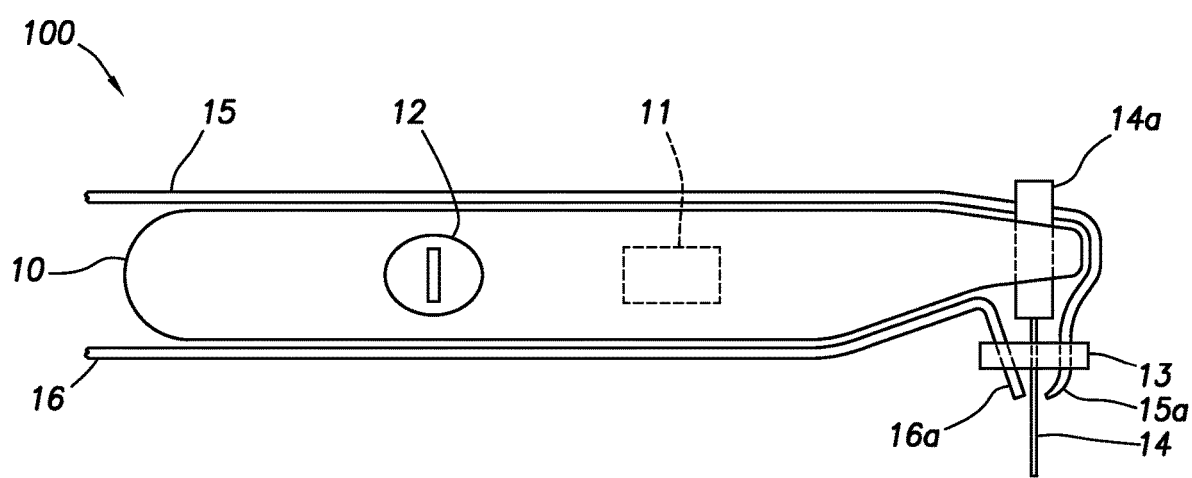
FIG. 2 is a top view of a dental system including the dental tool and further including a liquid delivery tube and suction tube according to certain embodiments.

Turning to the figures, FIG. 1 shows a dental tool according to certain embodiments, and FIG. 2 shows a dental system according to certain embodiments. According to certain embodiments, the dental tool and the dental system are used for performing a root canal.

The dental tool includes a hand piece 10, an endodontic file 14, a stopper 13, and a mechanical motion module 11. The hand piece 10 can be made from a variety of materials, for example, a rigid plastic. The hand piece 10 can have a generally cylindrical-shaped body with a curved end and a nose. The nose can have an opening for receiving a file handle 14a of the endodontic file 14. The hand piece 10 can have length dimensions in the range of 5 inches (in.) to 8 in. (12.7 centimeters (cm.) to 20.3 cm.). The hand piece 10 can have a diameter in the range of 0.5 in. to 2.5 in. (1.25 cm. to 6.4 cm.). According to certain embodiments, the hand piece 10 has dimensions selected such that a user can comfortably grasp the hand piece 10, while at the same time not be too large to obscure vision into a patient's mouth.

The endodontic file 14 can include the file and a file handle 14a. The endodontic file 14, according to certain embodiments, is a hand file. As used herein, the term "hand file" means an endodontic file that is typically held in one's hand by the file handle for performing a procedure on a patient. The endodontic file 14 can be made from a variety of materials, most commonly a metal, metal alloy, plastic, nylon, or rubber. As used herein, the term "metal alloy" means a mixture of two or more elements, wherein at least one of the elements is a metal. The other element(s) can be a non-metal or a different metal. By way of example, some common metals or metal alloys for endodontic hand files include, but are not limited to, aluminum, stainless steel, or a nickel titanium alloy. The endodontic file 14 can have a variety of dimensions. It is customary that endodontic files are available in a variety of lengths to allow the user to more accurately perform a procedure on a patient based on the length of a canal, for example, for performing a root canal. Common lengths of endodontic files range from 21 millimeters (mm.) to 31 mm. Additionally, the file tip is generally available in a variety of outer diameters to accommodate the different internal diameters of a patient's canal. It is to be understood that the dental tool and dental system are designed to be used with any type and size of endodontic file.

The dental tool and dental system also includes the stopper 13. The stopper 13 includes a first hole 17 for receiving a portion of the endodontic file 14. The stopper 13 can be cylindrical in shape. The stopper 13 can have a height ranging from 0.5 mm to 3 mm and an outer diameter ranging from 2 mm to 5 mm. The stopper 13 can be made from a variety of materials including, but not limited to, rubbers, soft plastics, and hard plastics. The first hole 17 can have a diameter that is selected for receiving a portion of the endodontic file 14. By way of a non-limiting example, the first hole 17 can have a diameter in the range of 0.05 mm to 0.2 mm.

Figure 4:
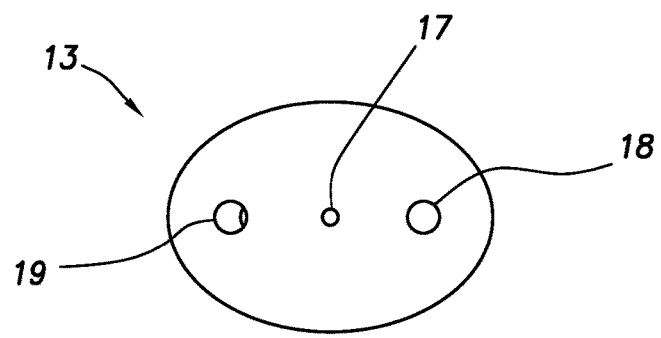
FIG. 4 is a top view of the stopper according to certain embodiments.

As shown in FIG. 2, the dental system 100, includes the hand piece 10, the endodontic file 14, and the stopper 13. The endodontic file 14 can be a hand file, rotary file, nerve broach, lentulo spiral, brush, or any instrument used to clean, distribute agents, or abrade, shape, or work inside the nerve and pulp network within a tooth. As can be seen in FIG. 4, the stopper 13 comprises at least two holes, wherein the first hole 17 receives a portion of the endodontic file 14, and wherein the second hole 18 receives a portion of a first tube 15. The first tube 15 can be a tube for delivering a liquid. The stopper 13 can further include a third hole 19 for receiving a portion of a second tube 16. The second tube 16 can be a suction tube for suctioning liquids. It is not uncommon for the inner and outer diameters of a liquid delivery tube to be smaller than the diameters of a suction tube. According to certain embodiments, the diameter of the second hole 18 and third hole 19 are selected such that the first tube 15 and second tube 16 can be inserted through the second hole 18 and third hole 19. The diameter of the second hole 18 can range from 0.3 mm. to 0.7 mm. The diameter of the third hole 19 can range from 1 mm. to 2.5 mm.

As can be seen in FIG. 2, a first end 15a of the first tube 15 can be inserted through the second hole 18 of the stopper 13. The first end 15a can be angled and positioned such that a liquid flowing through the first tube 15 drips or runs down onto the endodontic file 14 into a very specific and desired location in a patient's mouth. This angled end ensures that the liquid being dispensed remains localized and does not cause harm or damage to surrounding tissues. As can also be seen, a first end 16a of the second tube 16 can be inserted through the third hole 19 of the stopper 13. The first end 16a of the second tube 16 can be inserted a desired distance through the third hole 19 such that proper suction of liquids is achieved.

The dental tool and optionally the dental system includes the mechanical motion module 11. The mechanical motion module 11 can be located within the body of the hand piece 10. The hand piece 10 can further include a switch 12 for activating and deactivating the mechanical motion module 11 (i.e., an on/off switch). The switch 12 can be located on the outside of the body of the hand piece 10 such that a user can easily activate and deactivate the mechanical motion module 11.

The mechanical motion module 11 imparts mechanical motion to the endodontic file 14. The mechanical motion can be rotary, oscillating, vibrating, or reciprocating. Rotary motion will impart circular rotation to the endodontic file 14. Oscillating motion will impart repeated back and forth or circular motion to the endodontic file 14. Vibrating motion will impart random motion in a multitude of directions to the endodontic file 14. Reciprocating motion will impart a repetitive up-and-down or back-and-forth linear motion to the endodontic file 14.

Figure 3:
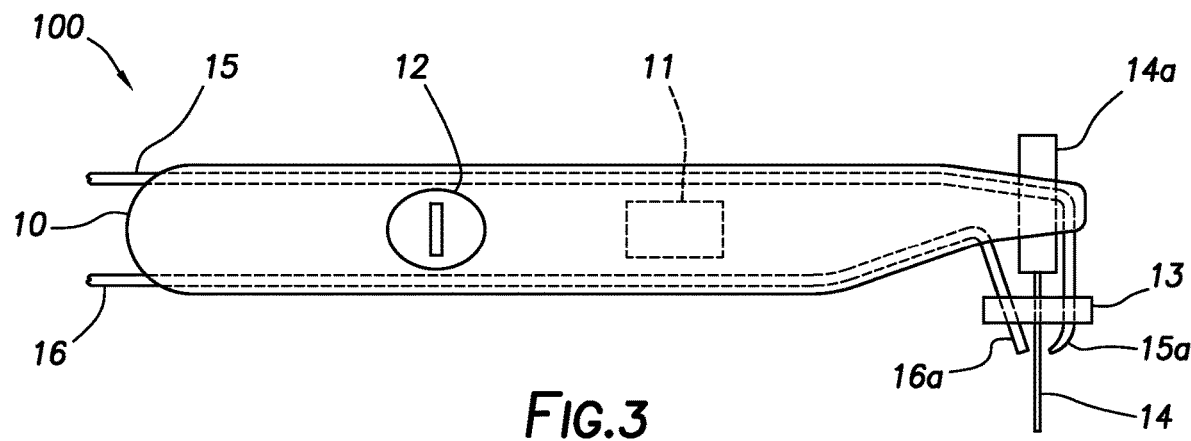
FIG. 3 is a top view of the dental system of FIG. 2 according to certain other embodiments.

As can be seen in FIG. 2, the first tube 15 and the second tube 16 can be positioned on the outside of the hand piece 10. According to this embodiment, at least a portion of the first tube 15 and the second tube 16 can be affixed to the outside of the hand piece 10, for example, via a fastener such as tape, adhesive, or clips. As can be seen in FIG. 3, a portion of the first tube 15 and the second tube 16 can be located inside the body of the hand piece 10. According to this embodiment, a portion of each tube comprising a first and second end of each tube will extend away from the body of the hand piece 10.

Figure 5:
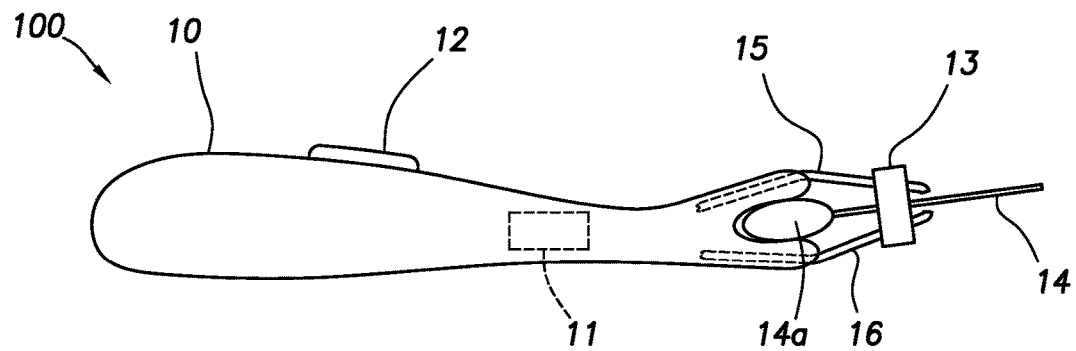
FIG. 5 is a top view of the dental system showing the file positioned in the hand piece in a different configuration according to certain other embodiments.
Figure 6:
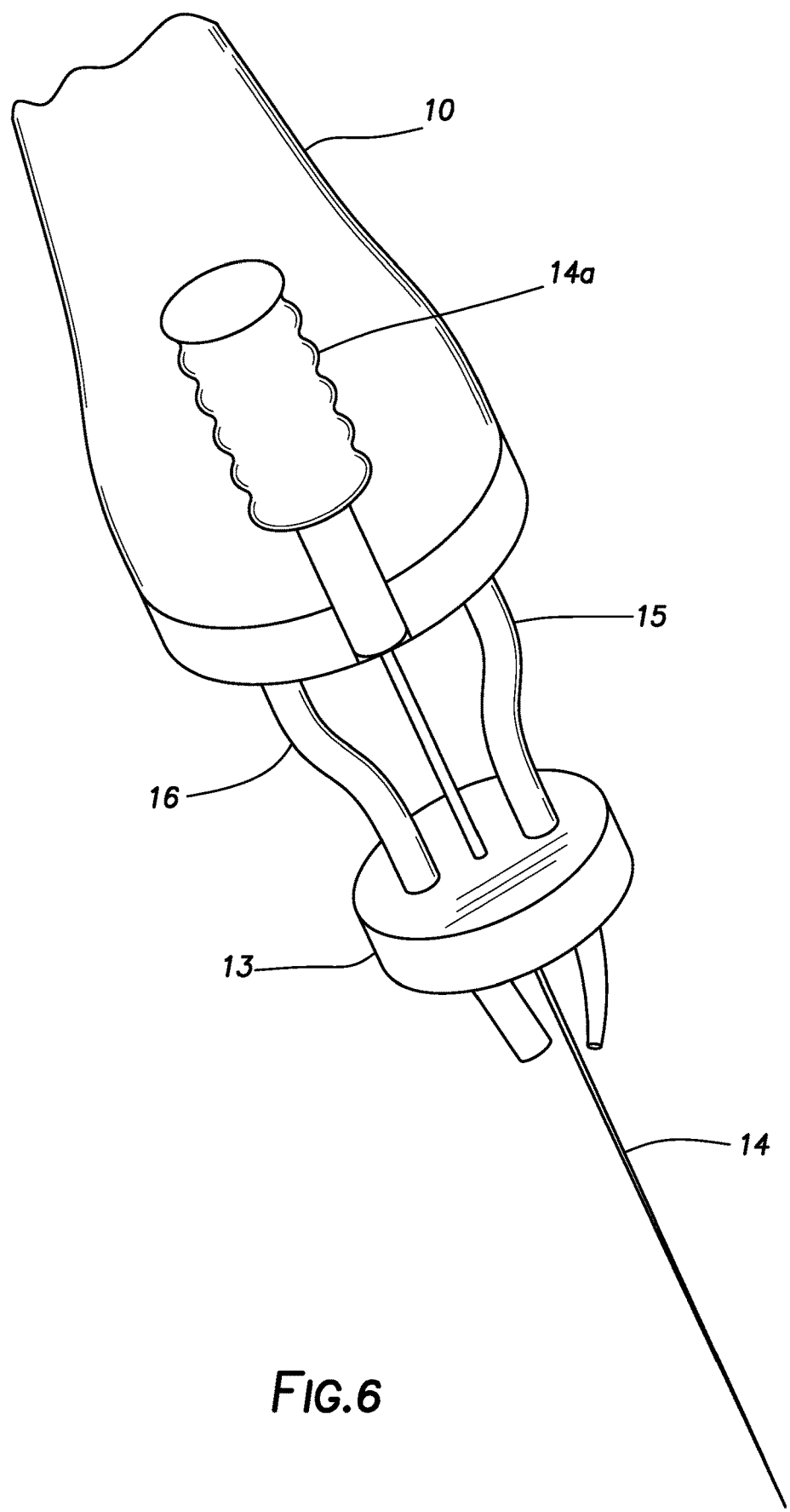
FIG. 6 is an enlarged view showing the file handle positioned within the hand piece.

FIGS. 5 and 6 shows the endodontic file 14 being positioned in a different orientation within the hand piece 10. As shown in FIGS. 1-3, the endodontic file 14 is positioned perpendicular to the body of the hand piece 10 with the file handle 14a being positioned into an opening of a head of the hand piece 10. As shown in FIGS. 5 and 6, the endodontic file 14 is positioned in line with the body of the hand piece 10 wherein at least a portion of the file handle 14a is inserted into an opening of a head of the hand piece 10.

In use, the endodontic file 14 can be replaced with another file by first removing the first end 15a of the first tube 15 and the first end 16a of the second tube 16 from the stopper 13 such that both the first and second tubes are no longer connected to the stopper. Next, remove the stopper 13 from the endodontic file 14 by sliding the stopper 13 towards the file tip and away from the file handle 14a. Then, remove the endodontic file 14 from the hand piece 10 by pulling the endodontic file 14 in a direction away from the head of the hand piece 10. A different file can then be replaced by reversing the steps for removal.

Figure 7:
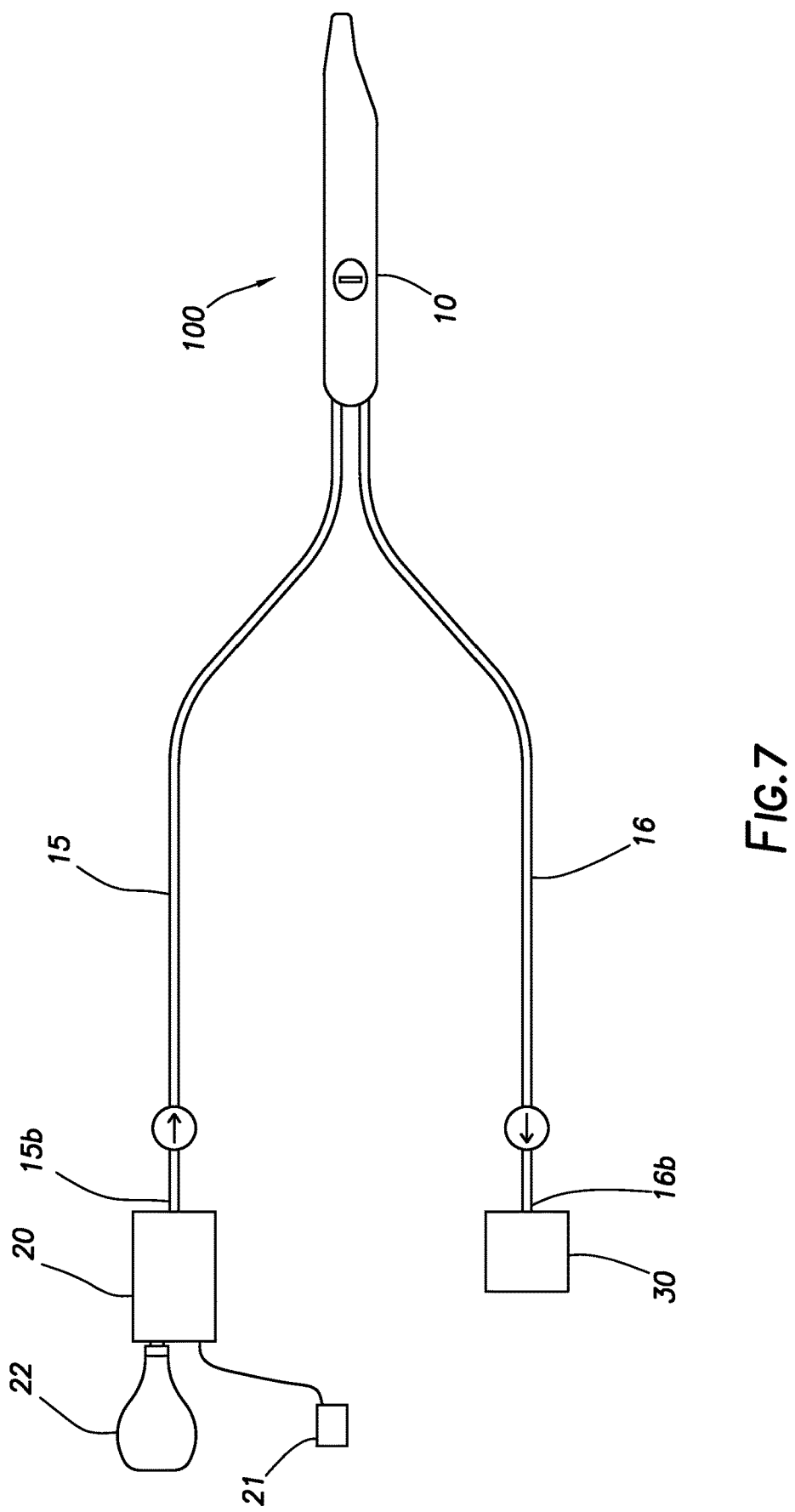
FIG. 7 is a schematic of the dental system.

As discussed above, the dental system includes at least a first tube 15 for dispensing a liquid. The dental system can optionally include a second tube 16 for suctioning liquid. As shown in FIG. 7, the dental system can further include a pump 20, a pump actuator 21, and a liquid reservoir 22 for dispensing a liquid to the endodontic file 14. The pump can be any pump capable of dispensing a liquid. The pump actuator can be for example a foot actuated pedal that can be positioned near a user's foot for controlling dispensing of the liquid. Preferably, the pump has a flow rate adjustment for selecting the desired flow rate of the liquid. Typical flow rates of liquids for dental procedures range from one to five drops per second. A second end 15b of the first tube 15 can be inserted into the pump 20. The dental system can further include a suction pump 30 that receives the second end 16b of the second tube 16 for suctioning liquids from a patient's mouth. The suction pump can have an on/off switch for activating and deactivating the suction.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more tubes, ends, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A dental system comprising:
   a hand piece;
   an endodontic file; and
   a stopper comprising at least two holes, wherein a first hole receives a portion of the endodontic file, and wherein a second hole receives a portion of a first tube.

2. The dental system according to claim 1, wherein the endodontic file is selected from a hand file, rotary file, nerve broach, lentulo spiral, or brush.

3. The dental system according to claim 1, wherein the stopper is made from rubbers, soft plastics, or hard plastics.

4. The dental system according to claim 1, wherein the first hole has a diameter in the range of 0.05 mm to 0.2 mm.

5. The dental system according to claim 1, wherein the first tube is a tube for delivering a liquid.

6. The dental system according to claim 5, wherein a first end of the first tube is angled and positioned through the first hole of the stopper such that the liquid flowing through the first tube drips or runs down onto the endodontic file into a very specific and desired location in a patient's mouth.

7. The dental system according to claim 6, wherein the stopper further comprises a third hole for receiving a portion of a second tube.

8. The dental system according to claim 7, wherein the second tube is a suction tube for suctioning liquids.

9. The dental system according to claim 8, wherein a first end of the second tube is positioned through the third hole of the stopper and located adjacent to an area wherein fluids require suctioning.

10. The dental system according to claim 9, further comprising a pump, a pump actuator, and a liquid reservoir for dispensing the liquid to the endodontic file, wherein the pump receives a second end of the first tube.

11. The dental system according to claim 9, further comprising a suction pump, wherein the suction pump receives a second end of the second tube.

12. The dental system according to claim 1, further comprising a mechanical motion module that imparts mechanical motion to the endodontic file.

13. The dental system according to claim 12, wherein the mechanical motion module is located within the body of the hand piece.

14. The dental system according to claim 13, wherein the hand piece further comprises a switch for activating and deactivating the mechanical motion module.

15. The dental system according to claim 14, wherein the mechanical motion is rotary, oscillating, vibrating, or reciprocating.

* * * * *